United States Patent
Hirsimäki et al.

(10) Patent No.: US 7,876,679 B2
(45) Date of Patent: Jan. 25, 2011

(54) CONNECTION-ORIENTED DATA TRANSFER OVER WIRELESS TRANSMISSION PATHS

(75) Inventors: Jani Hirsimäki, Tampere (FI); Päivi Rajala, Tampere (FI)

(73) Assignee: Nokia Corporation, Espoo (FI)

( * ) Notice: Subject to any disclaimer, the term of this patent is extended or adjusted under 35 U.S.C. 154(b) by 946 days.

(21) Appl. No.: 11/140,415

(22) Filed: May 27, 2005

(65) Prior Publication Data

US 2006/0291435 A1    Dec. 28, 2006

(30) Foreign Application Priority Data

May 31, 2004    (FI)    ................................. 20040737

(51) Int. Cl.
  *H04L 29/08*    (2006.01)
(52) U.S. Cl. .................. 370/231; 370/235; 370/236; 370/331; 455/552.1; 709/232; 709/233; 709/235
(58) Field of Classification Search .............. 370/231, 370/338, 401, 235–237, 331–333, 395.21, 370/395.52; 455/436, 432.1, 433, 552.1; 709/225, 232–235, 221
See application file for complete search history.

(56) References Cited

U.S. PATENT DOCUMENTS

| 6,757,245 | B1 * | 6/2004 | Kuusinen et al. | 370/230 |
| 7,054,317 | B1 * | 5/2006 | Jung et al. | 370/395.1 |
| 2001/0037472 | A1 * | 11/2001 | Li | 714/4 |
| 2003/0120826 | A1 * | 6/2003 | Shay | 709/316 |
| 2003/0206520 | A1 * | 11/2003 | Wu et al. | 370/230 |
| 2003/0219034 | A1 * | 11/2003 | Lotter et al. | 370/469 |

FOREIGN PATENT DOCUMENTS

| CN | 13033557 A | 11/2001 |
| EP | 0948168 A1 | 10/1999 |
| WO | WO-96/36150 A1 | 11/1996 |
| WO | WO 99/50998 | 10/1999 |
| WO | WO-00/76139 A1 | 12/2000 |
| WO | WO-01/93513 A2 | 12/2001 |
| WO | WO-02/076036 A1 | 9/2002 |
| WO | WO-03/081873 A1 | 10/2003 |
| WO | WO-2004/010657 A1 | 1/2004 |

OTHER PUBLICATIONS

Stevens, TCP/IP Illustrated, Dec. 31, 1993, vol. 1: The Protocols, chapter 20 section 2.*

(Continued)

*Primary Examiner*—Aung S Moe
*Assistant Examiner*—Hoon J Chung
(74) *Attorney, Agent, or Firm*—Harrington & Smith

(57) ABSTRACT

Providing a data transfer connection according to a connection-oriented data transfer protocol between a first communication entity and a second communication entity using a wireless transmission path, the first communication entity being capable of using at least two wireless transmission paths in data transfer. A data transfer connection is established between said first communication entity and said second communication entity in so that the first communication entity uses one of the wireless transmission paths on the data transfer connection. The data transfer flow is controlled on said data transfer connection using one or more windows that indicate the maximum amount of data to be transferred simultaneously on said data transfer connection. At least one of said windows is adjusted based on the wireless transmission path used.

19 Claims, 6 Drawing Sheets

OTHER PUBLICATIONS

Gupta et al., A Generalized Model for Link Layer Triggers, Mar. 1, 2004, IEEE.*

Inamura et al., TCP over Second and Third Generation Wireless Networks—RFC 3481, Feb. 2003, IETF.*

Koga et al., TCP Flow Control Using Link Layer Information in Mobile Networks, Jun. 19, 2002, Internet Performance and Control of Network Systems III, Robert D. van der Mei, Frank Huebner, Editors, Proceedings of SPIE vol. 4865 (2002), p. 305-315.*

Window Adaptive TCP for EGPRS Networks, Duan-Shin Lee et al., Oct. 30, 2002.

Allman, M. et al., "TCP Congestion Control", IETF Standard RFC2581, Apr. 1999.

Braden, R., "Requirements for Internet Hosts—Communication Layers", IETF Standard RFC1122, Oct. 1989.

"Wireless Profiled TCP", Version Mar. 31, 2001, Wireless Application Protocol WAP-225-TCP-20010331-a.

* cited by examiner

CONNECTION-ORIENTED DATA TRANSFER OVER WIRELESS TRANSMISSION PATHS

FIELD OF THE INVENTION

The invention relates to connection-oriented data transfer over wireless transmission paths. The invention is particularly, but not exclusively, related to the implementation of a data transfer connection, such as Transmission Control Protocol/Internet Protocol (TCP/IP), according to a connection-oriented data transfer protocol operating on the transport layer in wireless networks or on wireless data transfer connections.

BACKGROUND OF THE INVENTION

TCP/IP is a connection-oriented packet-switched data transfer protocol of the transport layer. The reliability of TCP is implemented by means of sequence numbers and acknowledgements (ACKs). The data octets are numbered and packed into segments of various sizes for transmission. The receiver is required to provide a positive acknowledgement to the octets sent. If an acknowledgement is not received during a predetermined time-out interval, the data is resent.

The TCP data flow is controlled by so-called sliding windows. In connection with acknowledgements, the receiver informs the transmitter of a reception window by means of which the receiver indicates up to which sequence number the receiver is capable of receiving data at the moment in question. In other words this reception window indicates the allowed amount of non-acknowledged octets which can be transferred "from the point of view of the receiver". The receiver controls the data flow by adjusting the size of the reception window. The transmitter in turn controls the flow by means of its own congestion window. In the so-called slow start the congestion window is set to be small at the beginning of the connection and, in principle, it is increased until time-out occurs or the size of the congestion window reaches the size of the receiver's reception window. The window in which the transmitter sends data is determined on the basis of both the transmitter's congestion window and the receiver's reception window so that the smaller of these determines the size of the window in which data is sent. In other words, the transmitter sends data in a window whose size is min(the size of the transmitter's congestion window, the size of the receiver's reception window).

The slow start and the concept of a congestion window mentioned above have been defined in the standard RFC2581 (April 1999) of the Internet Engineering Task Force (IETF). In addition, requirements for TCP protocol implementations have been laid down in section 4.2 of the IETF standard RFC1122 (October 1989), among others. (Various features of TCP implementations have also been defined in other IETF standards.)

TCP was originally designed to be used in wired networks in which the connection used by the TCP end points is mainly stable, such as an Ethernet connection. Therefore the control mechanisms of TCP have mainly been designed for stable connections. In wireless networks the situation is different, because a single wireless client device can support a plurality of different link-level transmission paths, which include, for example, Circuit Switched Data (CSD), High Speed Circuit Switched data (HSCSD), General Packet Radio Service (GPRS), Enhanced GPRS (EGPRS), Code Division Multiple Access (CDMA), Wideband CDMA (WCDMA), Bluetooth and Wireless Local Area Network (WLAN) and which provide service to upper protocol layers, such as transfer of TCP/IP data over a cellular network. Each of these transmission paths has different connection-level characteristics (for example, bandwidth and Round Trip Time (RTT)).

The capacity of a wireless link can be calculated as follows:

$$\text{capacity (bits)} = \text{bandwidth (bits/sec)} * \text{RTT (sec)}.$$

This is called a Bandwidth Delay Product (BDP). In wireless links this can vary widely depending on the wireless transmission path and consequently the connection level of a single wireless client device can vary and the upper level TCP protocol is required to adjust to these variations.

The size of the reception window required to maximize the TCP throughput is calculated on the basis of BDP. If the reception window is too small in terms of the available bandwidth, the TCP connection cannot fully utilize the available data transfer capacity. If, on the other hand, the reception window is too large, the transmitter's congestion window increases up to a point where TCP causes congestion in the network by a too large amount of segments and some of the segments do not reach as far as the receiver or arrive too late at the receiver. Usually the size of the reception window is hardcoded in TCP implementations, or the size of the window is permanently set at some default value or the user can be allowed an opportunity to adjust the size of the reception window by means of a Socket Application Programming Interface (API). However, this is not an optimal solution in a wireless environment as will be explained in greater detail below in connection with the detailed description of the invention.

SUMMARY OF THE INVENTION

One objective of the present invention is to provide a new method of providing a data transfer connection according to a connection-oriented data transfer protocol operating on the transport layer between a first and a second communication entity, such as a client device and a server or two client devices, when at least part of the data transfer connection utilizes a wireless transmission path.

According to a first aspect of the invention, there is provided a first communication entity comprising:

communication means for communicating with a second communication entity by means of a data transfer connection according to a connection-oriented data transfer protocol, the communication means being capable of using at least two alternative wireless transmission paths on said data transfer connection, means for controlling the data transfer flow on said data transfer connection by using one or more windows that indicate the maximum amount of data transferred simultaneously on said data transfer connection, and adjustment means for adjusting at least one of said windows on the basis of the wireless transmission path used on said data transfer connection.

According to a second aspect of the invention, there is provided system that comprises a first communication entity and a second communication entity and at least one gateway element, said first and second communication entity being arranged to communicate with each other by means of a data transfer connection according to a connection-oriented data transfer protocol through said gateway element and wherein said first communication entity comprises:

communication means for using at least two alternative wireless transmission paths on said data transfer connection between said first communication entity and said gateway element, means for controlling the data transfer flow on said data transfer connection between said first and second communication entity by using one or more windows that indicate the maximum amount of data transferred simultaneously on said data transfer connection, and adjustment means for adjusting at least one of said windows on said data transfer connection on the basis of the wireless transmission path used between said first communication entity and said gateway element.

The first communication entity according to the invention and/or the second communication entity may be any device capable of communicating over a wireless transmission path and utilizing at least two wireless transmission paths. Such a device may be, for example, a mobile communication, a lap-top computer, a hand-held computer, an intelligent telephone or another client device equipped with a communication module or another such unit. The communication module in question may be a part integrated in said device, or the device may be functionally connected to a separate communication module.

According to a third aspect of the invention, there is provided a method for providing a data transfer connection according to a connection-oriented data transfer protocol between a first communication entity and a second communication entity through an at least partly wireless transmission path, said first communication entity being capable of utilizing at least two alternative wireless transmission paths in data transfer, which method comprises:

establishing a data transfer connection between said first communication entity and said second communication entity so that said first communication entity uses one of said at least two wireless transmission paths on said data transfer connection, controlling the data transfer flow on said data transfer connection by using one or more windows that indicate the maximum amount of data transferred simultaneously on said data transfer connection, and adjusting at least one of said windows on the basis of the wireless transmission path used.

According to a fourth aspect of the invention, a there is provided a computer program to for controlling a first communication entity to provide a data transfer connection according to a connection-oriented data transfer protocol with a second communication entity through an at least partly wireless transmission path, said first communication entity being capable of utilizing at least two alternative wireless transmission paths in data transfer, which computer program comprises:

computer executable program code for causing the first communication entity to establish a data transfer connection between said first communication entity and said second communication entity so that said first communication entity uses one of said at least two wireless transmission paths on said data transfer connection, computer executable program code for causing the first communication entity to control the data transfer flow on said data transfer connection by using one or more windows that indicate the maximum amount of data transferred simultaneously on said data transfer connection, and computer executable program code for causing the first communication entity to adjust at least one of said windows on the basis of the wireless transmission path used.

The computer program may be carried by a computer readable memory media or by a data signal.

The dependent claims concern the preferred embodiments of the invention. The subject matter of the dependent claims related to any one aspect of the invention may further be applied to the other aspects of the invention in applicable parts.

If the bottleneck in the transmission path capacity is the air interface, for example, the solution according to one embodiment of the invention can improve the throughput of the TCP connections and attain a more optimal use of the link level and the transmission path than formerly in wireless networks, in which case erroneous/unnecessary retransmissions are decreased, among others, which naturally saves radio resources. This means attaining a better user satisfaction.

By means of the solution according to the invention the TCP connection may be retained as a connection between end points. In addition, the invention may be implemented at the TCP layer level without need to change the application layer, for instance. This advantageously reduces complexity of implementation.

Further, the invention may be implemented in wireless client devices without the need to perform changes in server implementations. Thereby a wireless client device equipped with an implementation according to the invention may optimize its own TCP connections regardless of the implementation of the TCP connections of the opposite party.

BRIEF DESCRIPTION OF DRAWINGS

In the following the invention is explained in detail, by way of example only, with reference to the accompanying drawings, in which.

DETAILED DESCRIPTION

In the following the invention is described in detail using the TCP protocol as an example. However, the invention can also be applied in connection with other connection-oriented protocols operating on the transport layer. In addition, the invention can be applied to systems utilizing any wireless transmission paths.

Figure 1:
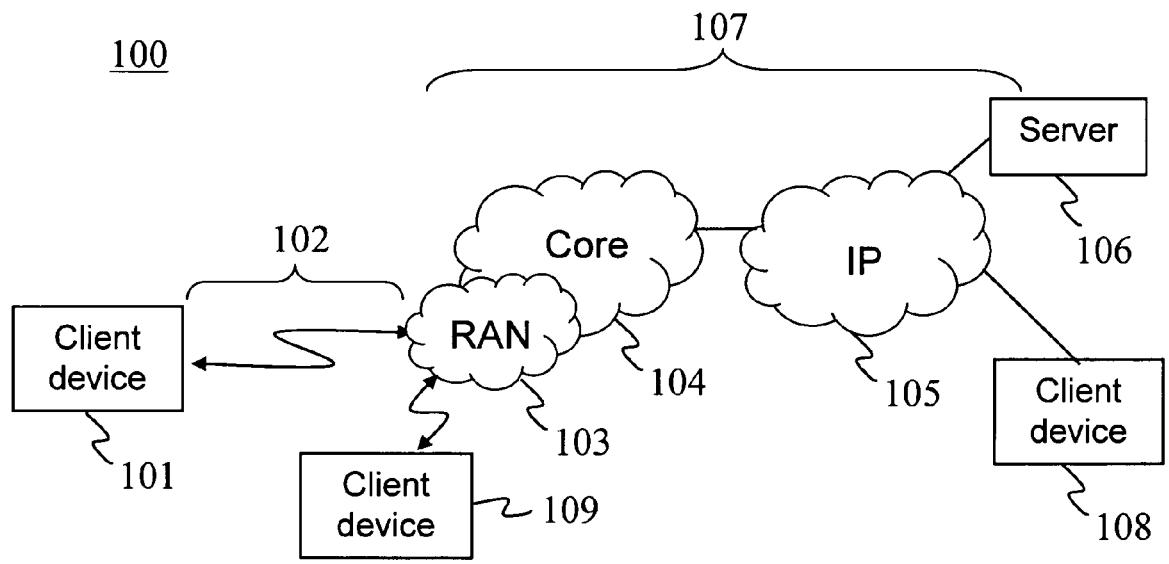
FIG. 1 shows an exemplary system where the invention can be applied.

FIG. 1 shows an exemplary system where the invention can be applied. The system comprises a core network 104 of a mobile communications network (which can be a GSM, GPRS, or WCDMA network, for example) and its radio access network (RAN) 103, which is connected to the core network (104). The radio access network 103 provides the client device with access to the mobile communications network through one or more base stations (not shown). A wireless link 102 exists between the radio access network 103 and the client device 101. A client device 109 is also connected to the radio access network 103 though a wireless link and the client devices 101 and 109 can communicate with each other through the mobile communications network.

The core network 104 is also connected to a wired IP network 105, which can be the Internet, for example, or a service provider operator's Intranet network (an Intranet network which belongs to the operator's domain), in which case the mobile communications network can provide the client device with a connection to the services of the IP network. The mobile communications network can provide a connection to other networks, too. In addition, the system comprises a server 106 and a client device 108 that are connected to the IP network 105. In practice a wired connection 107 exists between the server 106 and the mobile communications network, in which case the connection between the client device 101 and the server 106 consists of a wireless 102 and a wired 107 portion. Correspondingly the client device 108 and the client device 101 can communicate with each other over a connection consisting of a wireless and a wired portion.

The present invention can be applied in the communication between the client device 1 and the server 106, for example, or in the communication between the client devices 101 and 108 or the client devices 101 and 109. In addition to the alternatives shown in the figure, other implementations are also possible; for example, the client device 109 could be connected to another radio access network or to a mobile communications network that is directly or indirectly connected to the radio access network 103. A more detailed implementation is dealt with more specifically in connection with other figures.

Figure 2A:
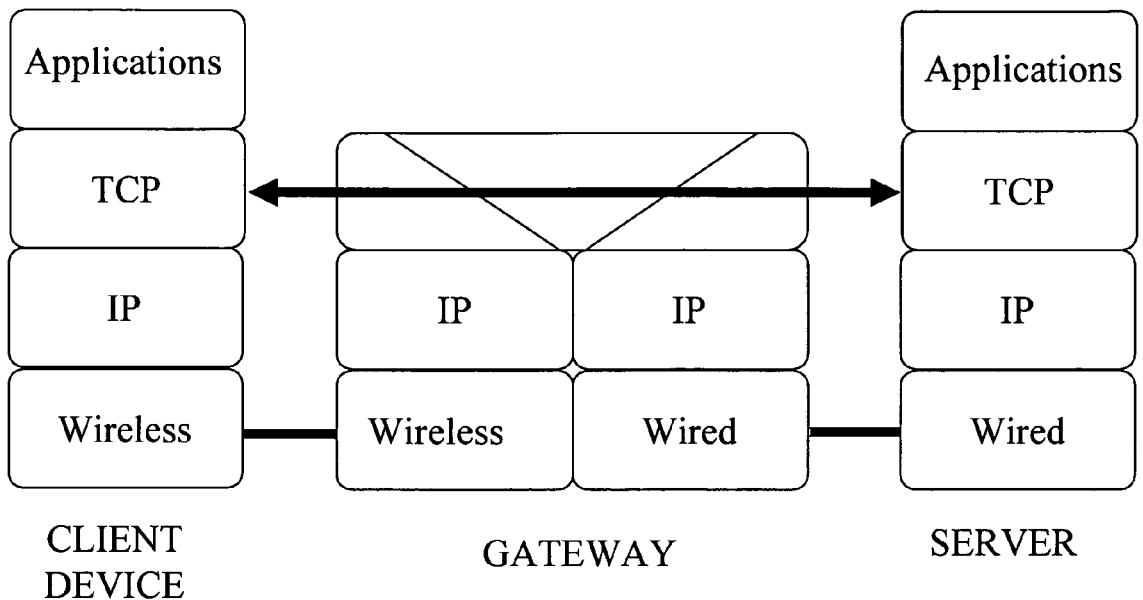
FIGS. 2A and 2B illustrate the communication between a client device and a server at a protocol stack level.
Figure 2B:
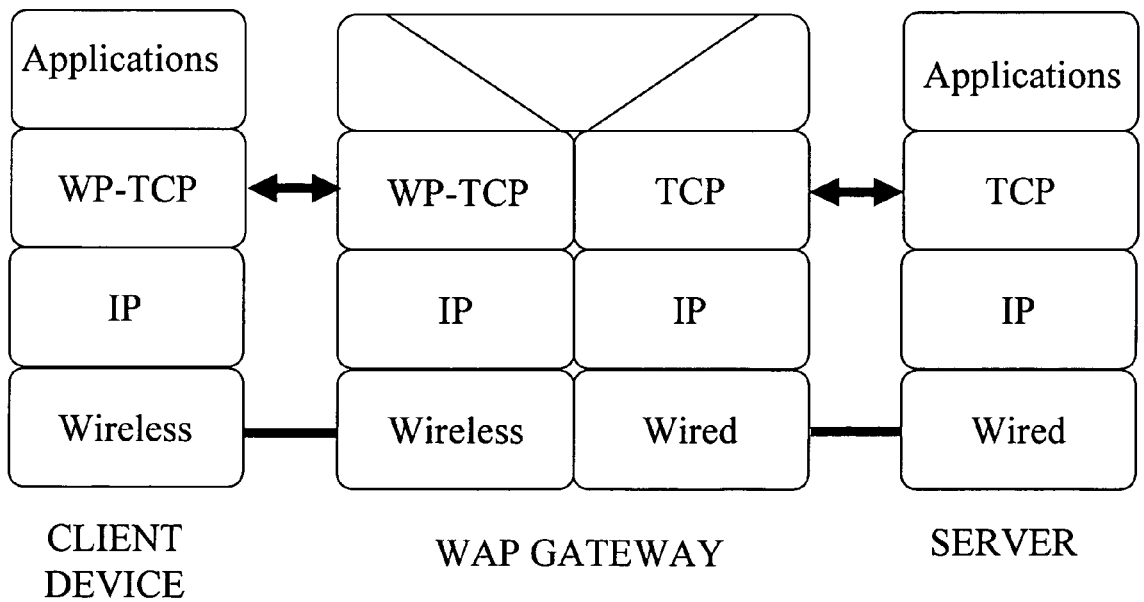

FIGS. 2A and 2B illustrate communication between a client device and a server at a protocol stack level.

The protocol stacks of FIG. 2A describe a so-called direct connect concept, where the TCP layer of a client device is directly connected to a server connected to the Internet, for example. The client device has a wireless physical layer link to a gateway element, which can be a Gateway GPRS Support Node (GGSN), for example, and which in turn has a wired link to the server with which the client device communicates at the TCP/IP level. At the TCP level the connection therefore is a connection between the client device and the server at the same time that the transmission path at the physical level may change in the course of the connection. TCP provides an end-to-end connection to the application layer applications. It is also possible that the link between the gateway element and the server is wireless or partly wireless.

The protocol stacks of FIG. 2B describe the so-called split TCP concept according to the Wireless Application Protocol (WAP) system, where a TCP connection between a client device and a server is split in two in a WAP gateway element. The connection between the client device and the WAP gateway element is a connection according to the Wireless-Profiled TCP (WP-TCP) protocol, and the connection between the WAP gateway and the server is a "normal" TCP connection. The WP-TCP protocol corresponds to the normal TCP protocol, but it contains requirements/definitions by means of which the operation of the TCP protocol is optimized for a wireless environment, in particular. WP-TCP is defined in more detail in the specification WAP-225-TCP-20010331-a, Version 31 Mar. 2001, of the Wireless Application Protocol Forum. In other respects the protocol stacks of FIG. 2B correspond to the ones shown in FIG. 2A, or the physical connection between the client device and the WAP gateway element is wireless and the physical connection between the WAP gateway element and the server is wired.

The examples of the protocol stack level shown above can also be applied to communication between client devices, or the server shown in FIGS. 2A and 2B can also be another client device and the physical link of this other client device to the (WAP) gateway element can also be (partly) wireless.

The problem solved by the invention is illustrated by the following example, where a user reads his e-mails on a client device from a service provider's mailbox (from an e-mail server). The user's client device supports not only GSM data (CSD data) but also GPRS and EGPRS data transfer. That is to say, the client device has available three different wireless transmission paths. In the TCP implementation of the client device the size of the reception window is hardcoded according to prior art to be the maximum window size supported by EGPRS (which has the biggest capacity of the transmission paths supported) in order to maximize the throughput of the TCP connection. However, in the present example the user uses GSM data (the EGPRS service is not available, for example).

Now a wireless CSD link of 9600 bits/s is established from the client device to the mobile communications network through which the client device has access to the e-mail server, and a TCP connection is established between the client device and the e-mail server. However, the size of the reception window of the client device is optimized for EGPRS connections.

Figure 3A:
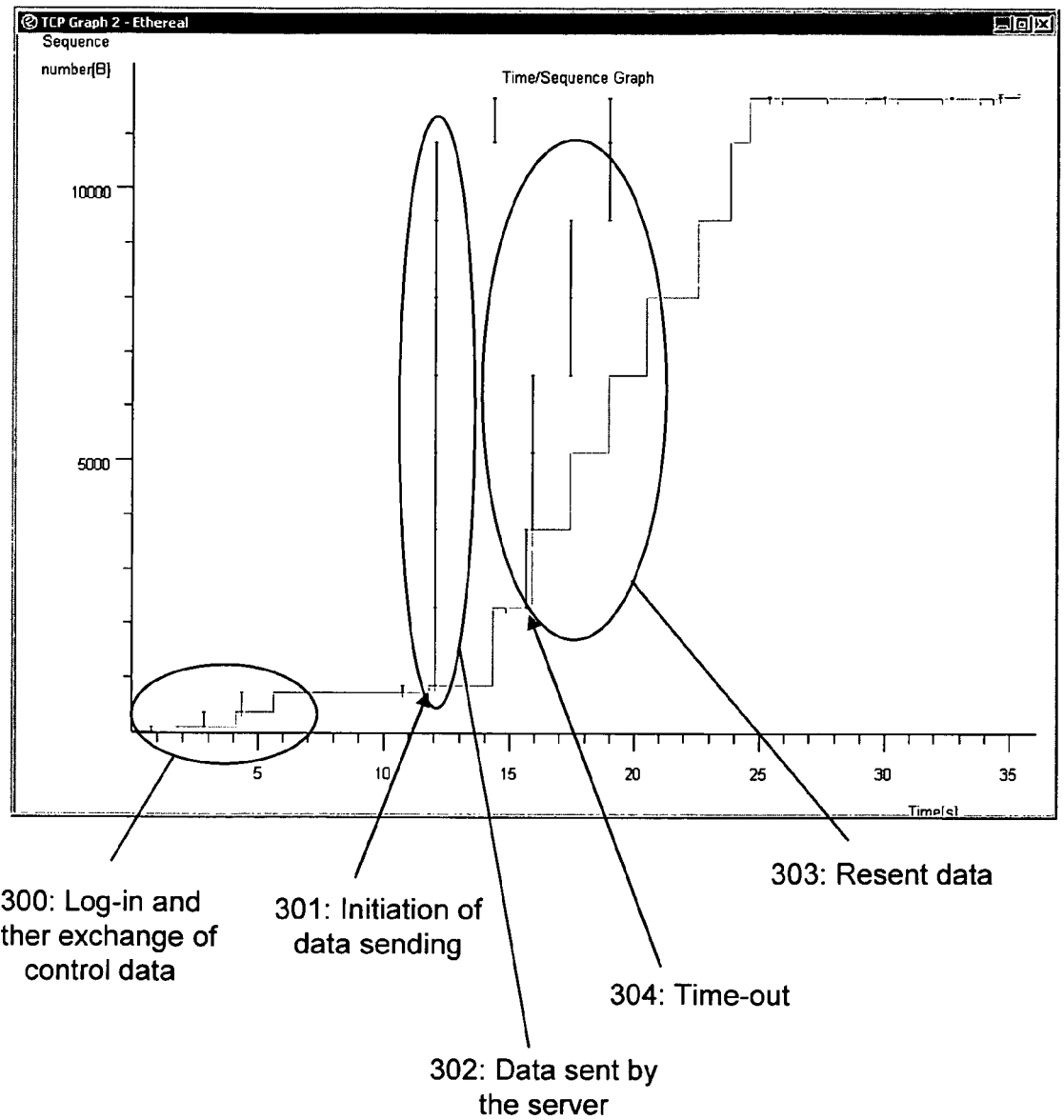
FIG. 3A illustrates the problem to be solved from a server point of view.
Figure 3B:
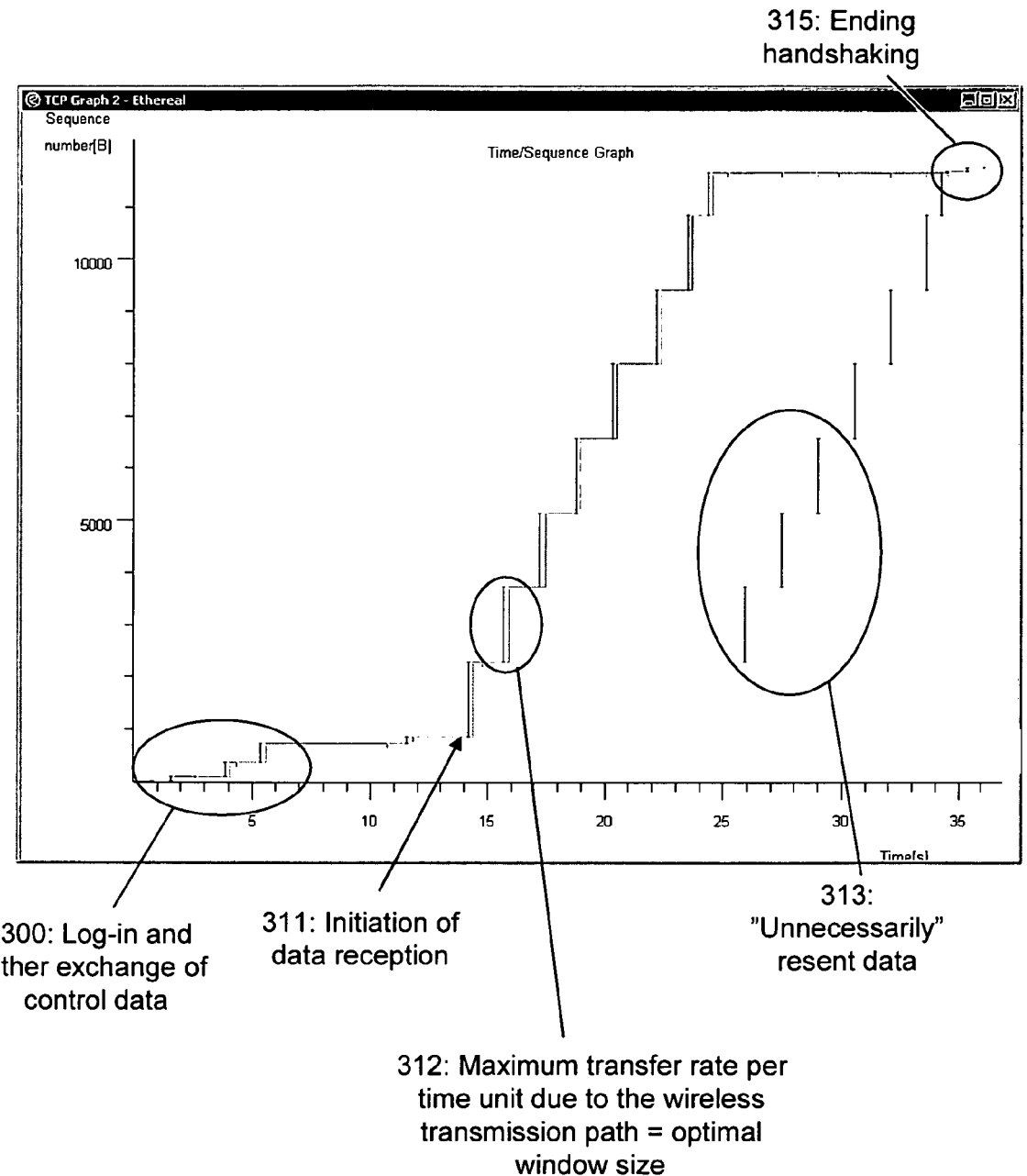
FIG. 3B illustrates the problem to be solved from a client device point of view.

FIGS. 3A and 3B illustrate the problem that arises in the situation of the present example in terms of the server and the client device, respectively.

Step 300 (shown in both figures) comprises performing log-in and other transmission of requests/responses according to the Internet Message Access Protocol (IMAP) at the beginning of the connection. These do not use up all of the capacity of the CSD link, so the connection works faultlessly. At the same time the server increases its congestion window according to prior art each time it receives a positive acknowledgement from the client device.

Next, at step 301 of FIG. 3A, the server transmits the actual data (e-mail). At this point the size of the congestion window of the server has had time to grow larger than the capacity of the CSD link. As the reception window of the client device does not restrict the amount of data sent by the server, either, the server assumes that a suitable window size is much larger than the capacity of the CSD link. Thus the server transmits a large amount of data at the same time at step 302.

As the wireless link used by the client device is slower than assumed, the client device has time to receive and acknowledge only part of the data transmitted by the server before the time-out interval of the server expires. At step 304 the server times out the transmission and resends the data at step 303, as it assumes that the unacknowledged part of the data is lost. In reality the transfer of data and the arrival of acknowledgements are only delayed and therefore the resending is unnecessary.

The throughput of the data transfer connection suffers significantly from the unnecessary resending. FIG. 3B shows that the client device receives (and acknowledges) data sent by the server at step 311. Step 312 shows the capacity of the wireless transmission path (CSD) or in practice the optimal window size of this connection, which is significantly smaller than the window in which the server transmitted data (FIG. 3A, step 302). Step 313 shows the unnecessarily resent data received by the client device, which naturally uses up capacity and thereby reduces throughput. Only after the reception of resent data the client device and the server can perform the ending handshakings according to the e-mail protocol, step 315, and find that the e-mail has been received.

The size of the reception window of the client device should therefore be the capacity of the slowest link in the data transfer connection. It is not sensible to feed more data into the network than the slowest link can transfer. The "sensible" amount of data can be calculated by the BDP of the slowest link, for example. In current systems the slowest link often is the wireless link between the client device and the mobile communications network (the capacity of the air interface). On the other hand, the reception window should always be aimed to be set as large as possible, so in the client device of this example it would not be sensible to hardcode the size of the reception window according to the capacity of the CSD link, either, because then the additional capacity provided would be lost when an EGPRS link is used.

A comparable problem may also arise in TCP communication between client devices or other communicating entities if, for example, one of the communicating entities uses a wired connection or a wireless connection whose capacity is larger than that of the wireless link used by the first communication entity.

In one embodiment of the invention a solution has been provided, where the wireless transmission path to be used in a client device for downlink data transfer is found out in connection with the opening of the data transfer connection and the size of the reception window of the client device is adjusted on the basis of the wireless transmission path used. As necessary/as far as possible the size of the reception window is also adjusted when the transmission path is changed during the data transfer connection. For uplink data transfer a new window affecting uplink transmission, which is herein referred to by the term maximum send window max_snd_wnd, is defined in the TCP Control Block (TCB) of the client device. TCB is an entity where information related to the TCP connection and needed during the connection is stored. The size of this maximum send window is adjusted on the basis of the wireless transmission path used, and the window in which the user sends data is defined not only by the congestion window of the client device and the reception window of the receiver but also by this maximum send window in such a way that the smallest of these determines the size of the window in which data is sent. In other words, the transmitter sends data in a window whose size is min(the size of the maximum send window of the client device, the size of the congestion window of the client device, the size of the reception window of the receiver).

Figure 3C:
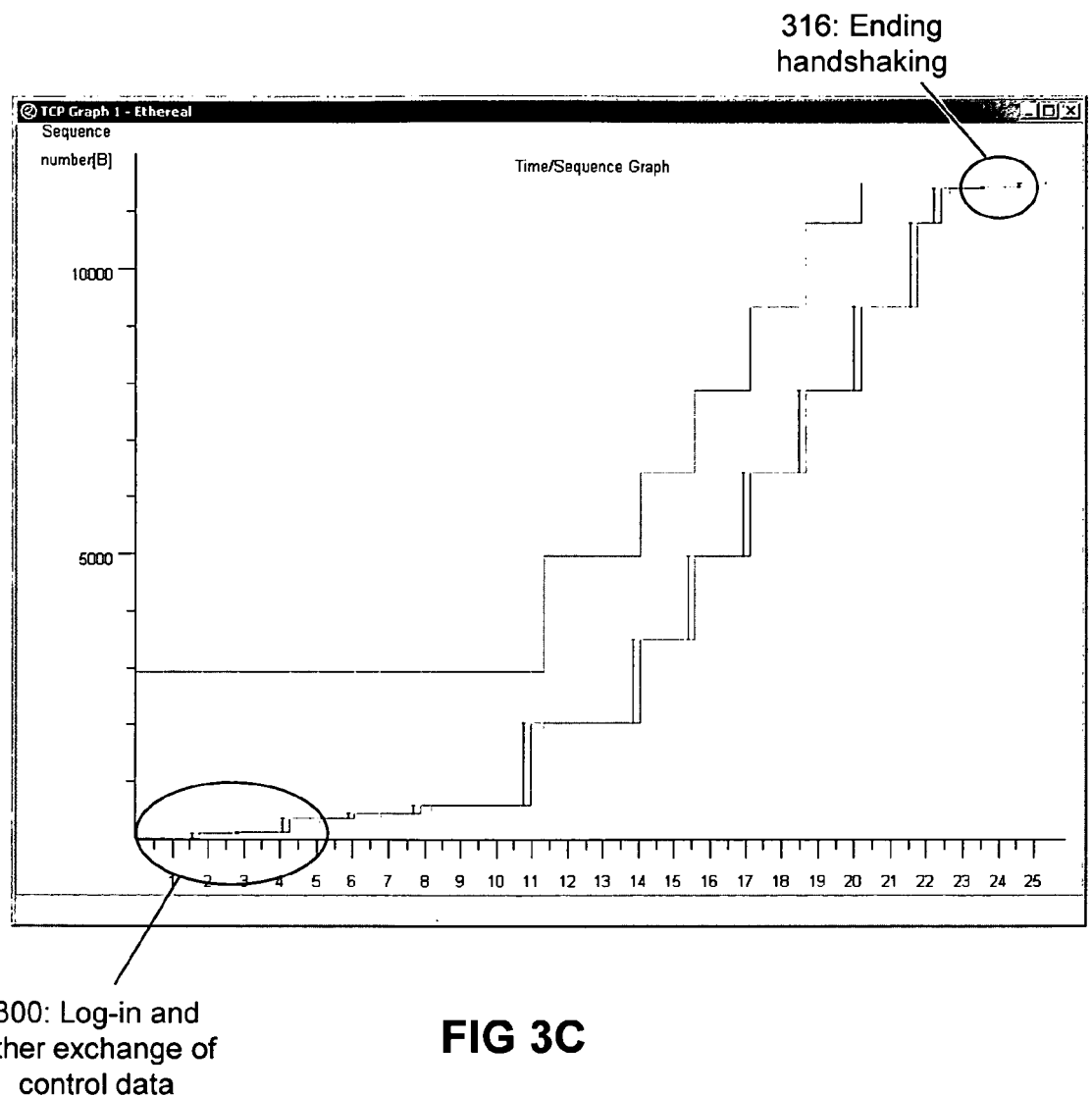
FIG. 3C illustrates data transfer from a client device point of view, when the window size is set optimally for a CSD link.

FIG. 3C illustrates the data transfer shown in FIGS. 3A and 3B from the point of view of a client device, when the reception window of the client device is adjusted to be optimal for the CSD link used in the example according to one embodiment of the invention. In other words the size of the reception window is adjusted to be suitable for the CSD link at the beginning of the connection between the client device and a server. Now the client device has time to acknowledge the data received in time, in which case unnecessary retransmission can be avoided.

The horizontal axis of FIG. 3B shows that without adjusting the size of the reception window the ending handshaking 315 that ends the data transfer is performed in the present example more than 35 seconds after the initiation of the data transfer, or the transfer of e-mail takes more than 35 seconds. On the other hand, it can be seen on the horizontal axis of FIG. 3C that when the size of the reception window is adjusted to be suited to the wireless transmission path used, the handshaking 316 that ends the data transfer is performed in the present example some 25 seconds after the initiation of the data transfer, or by adjusting the size of the reception window the transfer of the e-mail can be performed in some 25 seconds. In other words by adjusting the size of the reception window the transfer of the e-mail can be performed in the present example some 10 seconds faster than without the adjustment of the reception window.

In a corresponding way use of the maximum send window in uplink traffic improves throughput.

Figure 4A:
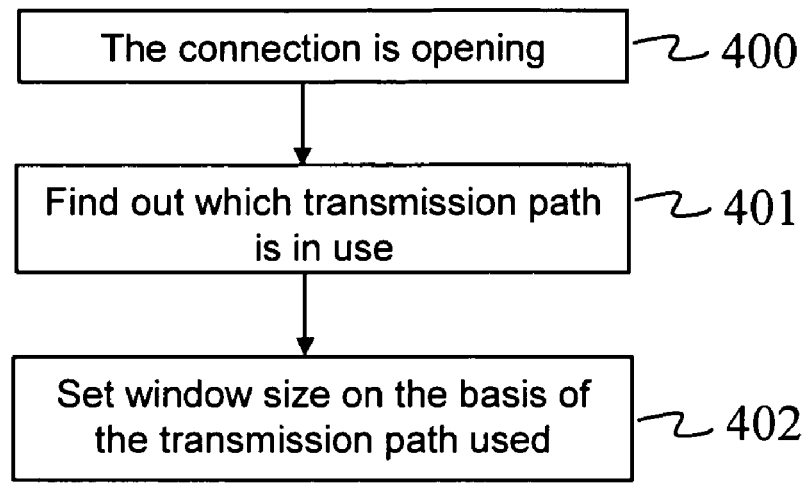
FIG. 4A shows a flow chart that illustrates a method according to one embodiment of the invention.

FIG. 4A shows a flow chart that illustrates a method according to one embodiment of the invention.

At step 400 a connection is opening up, step 401 comprises finding out which wireless transmission path the connection opening up uses, and step 402 comprises setting the size of the reception and/or maximum send window of a client device on the basis of the transmission path used. Steps 401 and 402 can be repeated as necessary when the connection is open, if the wireless transmission path used changes during the connection.

The method can be implemented in practice so that, for example, the TCP/Socket level monitors the wireless transmission path used at each point of time and adjusts the size of the reception and/or maximum send window as necessary. The step 401 can be implemented, for example, so that the link level tells the TCP level which wireless transmission path is in use, when the wireless link has been established or when the wireless transmission path has been changed. The TCP level can also query this from the link level. Other implementations can also be used. In any case some component of the client device knows which wireless transmission path is being used at each point of time, so this information can be queried from any suitable component.

The optimal window size for different transmission paths for step 402 can be determined as follows, for example:

- the optimal window size is sought for different transmission paths by preliminary testing and the results of this preliminary testing are stored to be used in the client device, or
- the window size is calculated "in real time" on the basis of RTT and the bandwidth of the transmission path used.

From the above methods, the former can give better results, because the client device is only able to measure the RTT of uplink data packets (TCP packets), whereas data traffic usually favors downlink traffic, or larger amounts of data are transferred downlink. The transmission path can also be asymmetric in its characteristics, or more capacity may be allocated downlink, for example, in which case the latter calculation method may give distorted results in some cases.

Figure 4B:
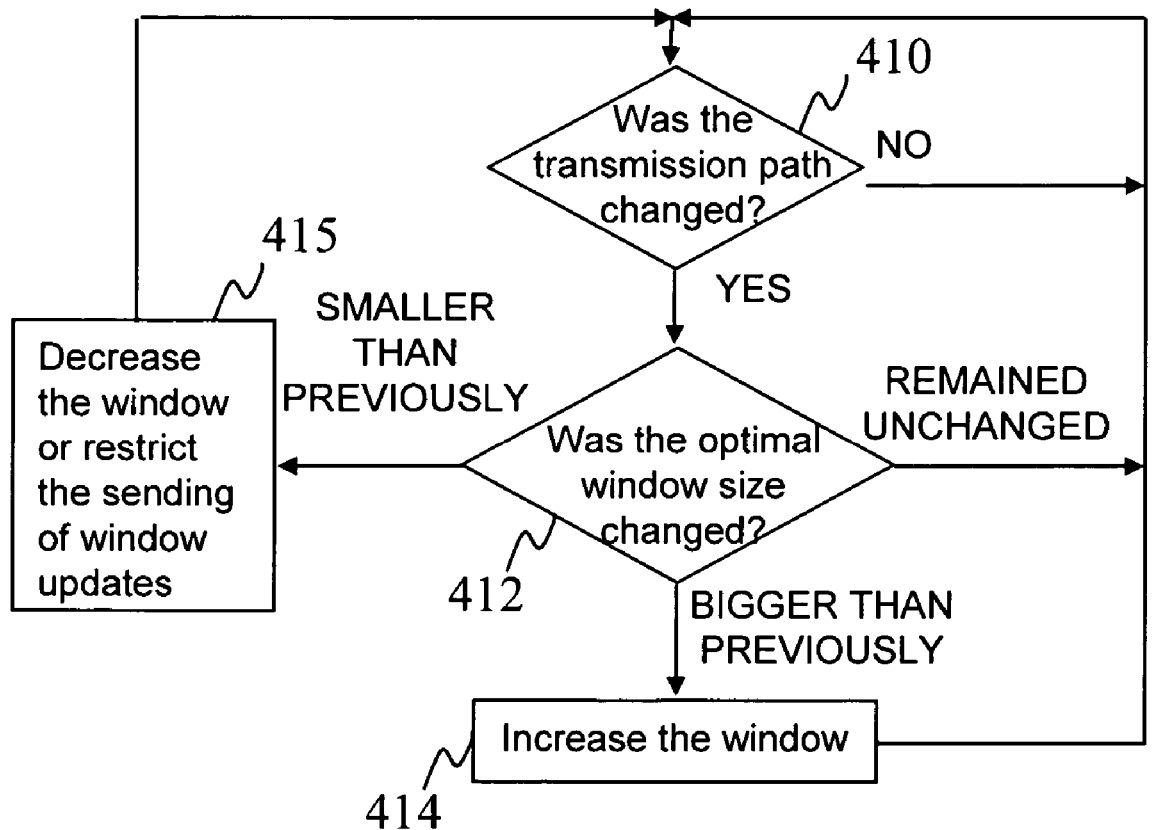
FIG. 4B shows a flow chart that illustrates a method of adjusting window size during the connection according to one embodiment of the invention.

FIG. 4B shows a flow chart that illustrates a method of adjusting window size during a connection according to one embodiment of the invention.

Step 410 comprises monitoring if a wireless transmission path used has changed. If the transmission path has not changed, the process remains at step 410. On the other hand, if the transmission path has changed, the process moves to step 412 which comprises checking if the change in the wireless transmission path leads to a change in the optimal window size, or if the capacity of the wireless transmission path used has changed. If the optimal window size has not changed, the process returns to step 410 to monitor changes in the wireless transmission path used. If the optimal window size has changed, the window size is adjusted at steps 414 and 415.

The process moves to step 414, if the capacity of the new wireless transmission path is larger than that of the old one, or if the optimal window size grows. In this case the reception window and/or the maximum send window max_snd_wnd are increased at step 414.

The process moves to step 415, if the capacity of the new wireless transmission path is smaller than that of the old one, or if the optimal window size becomes smaller. Step 415 comprises either decreasing the window or restricting the sending of window updates.

Restriction of window updates is an alternative implementation for the decrease of the size of the reception window, for example. Here the sending of window updates to the transmitter according to the TCP protocol is restricted (however, data received is acknowledged positively). In this case the transmitter assumes that the receiver receives data but does not read it from its data buffers. As a result, the window size available for the transmitter is decreased. In the following example, the size of the reception window of the client device is 12000 bytes, and the transmission path used by the client device is changed for one whose optimal window size is smaller than 12000 bytes, and the client device receives 1460 bytes of data. In this case the client device sends an acknowledgement (ACK) according to this embodiment and at the same time notifies that the window size is 12000−1460=10540 bytes, in which case in the future the transmitter sends data in a window whose size is in maximum 10540 bytes. This can be continued until the window size sent in the acknowledgement corresponds to the optimal window size for the wireless transmission path used. After this the window size sent in the acknowledgements can be retained at a size that is optimal for the wireless transmission path used.

Depending on the implementation, the maximum reception window can be decreased during the connection without any limitations.

From steps 414 and 415 the process returns to the step 410 to monitor changes in the wireless transmission path used.

Figure 5:
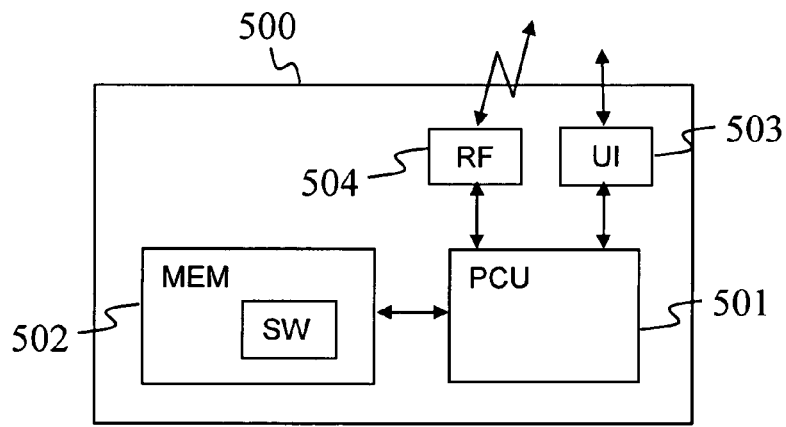
FIG. 5 shows a simplified block diagram of a client device according to one embodiment of the invention.

FIG. 5 shows a simplified block diagram of a client device 500 according to one embodiment of the invention, which may be any suitable communication entity, communication device or a device equipped with a communication module.

The client device 500 comprises a processing unit 501 and a radio frequency part (RF) 504 and a user interface (UI) 503 connected to it. The radio frequency part 504 produces an air interface to implement data transfer over a wireless transmission path. The radio frequency part is arranged to use at least two different wireless transmission paths. (In practice the radio frequency part 504 may consist of two or more radio frequency parts.) The user interface may comprise a display and a keyboard, for example, and potentially some other control means (not shown in the figure) by means of which the client device in question can be used. However, the invention can be utilized in devices with no actual user interface.

The client device further comprises a memory 502, to which the processing unit 501 is connected. A computer program is stored in the memory 502 to be executed by the processing unit. According to the computer program the processing unit controls the client device to use one of the wireless transmission paths that the radio frequency part is arranged to use for the establishment of a data transfer connection and to control the data transfer flow on said data transfer connection by using at least one window that indicates the maximum amount of data to be transferred simultaneously on the transport layer of said data transfer connection. In addition, the client device is controlled to adjust said at least one window on the basis of the wireless transmission path used, which window can be the TCP reception window of the client device or the new maximum send window max_snd_wnd defined for TCP.

The invention has been introduced above by means of examples without, however, restricting the invention to these examples. It is clear to a person skilled in the art that the invention may be used in connection with any applicable protocols and/or network technologies. The possibilities of implementation and use of the invention are only restricted by the claims attached. Thus the different implementation alternatives defined by the claims, including equivalent implementations, fall within the scope of the invention.

The invention claimed is:

1. A first communication entity comprising:
a processing unit, and
a memory including computer program code, where the memory and the computer program code are configured, with the processing unit, to cause the first communication entity to at least:
use at least two alternative wireless transmission paths for a data transfer connection with a second communication entity, where the at least two alternative wireless transmission paths each use different link level transmission paths;
pass, from a link level protocol layer to a transport level protocol layer of the data transfer connection, information identifying a wireless transmission path of the at least two alternative wireless transmission paths used for said data transfer connection with the second communication entity, where a particular wireless transmission path of the at least two alternative wireless transmission paths used for the data transfer connection was changed, during the data transfer connection, to the wireless transmission path that uses a different link level transmission path, and where the information is passed in response to the change; and
in response to the information from the link level protocol layer identifying the wireless transmission path using the different link level transmission path, adjust a size of at least one window of one or more windows that control a data transfer flow on said transport level protocol layer of the data transfer connection, wherein said adjustment is based at least on results of preliminary testing previously stored for said wireless transmission path using the different link level transmission path.

2. The first communication entity according to claim 1, wherein the adjusting comprises choosing the size of the at least one window of the one or more windows to be an optimal size predetermined for the wireless transmission path using the different link level transmission path.

3. The first communication entity according to claim 1, wherein the first communication entity is caused, for the case that the particular wireless transmission path is changed to another wireless transmission path which uses a different link level transmission path with a larger transfer capacity, to increase the size of said at least one window of the one or more windows.

4. The first communication entity according to claim 1, wherein the first communication entity is caused, for the case that the particular wireless transmission path is changed to another wireless transmission path which uses a different link level transmission path with a smaller transfer capacity, to decrease the size of said at least one window of the one or more windows.

5. The first communication entity according to claim 1, wherein the wireless transmission path between then first communication entity and the second communication entity passes through at least one gateway element associated with the different link level transmission path, and wherein the transmission path between said at least one gateway element and said second communication entity comprises a wired transmission path.

6. The first communication entity according to claim 1, wherein said at least one window to be adjusted is at least one of a reception window of the first communication entity, intended to control the data transfer flow from the second communication entity to the first communication entity, and a maximum send window of the first communication entity, intended to control the data transfer flow from the first communication entity to the second communication entity.

7. The first communication entity according to claim 1, wherein said second communication entity has a reception window for controlling the data transfer flow from the first communication entity to the second communication entity, and the first communication entity is caused to:

receive an indication of a size of a reception window of the second communication entity from the second communication entity;

define a congestion window for controlling the data transfer connection from the first communication entity to the second communication entity;

define a maximum send window;

adjust the size of said maximum send window on the basis of a wireless transmission path used for said data transfer connection; and use a smallest of the size of the reception window of the second communication entity, of the size of the congestion window of the first communication entity, and of the size of the maximum send window of the first communication entity to indicate a maximum amount of data to be transmitted from said first communication entity to said second communication entity.

8. The first communication entity according to claim 1, wherein said data transfer connection comprises a connection-oriented data transfer protocol which operates on a transport layer.

9. The first communication entity according to claim 1, wherein said data transfer connection comprises a transmission control protocol/internet protocol.

10. The first communication entity according to claim 1, wherein for a case that said first communication entity is a client device then said second communication entity is a server, and wherein for a case that the first communication entity is a server, then said second communication entity is a client device.

11. The first communication entity according to claim 1, wherein the at least two different link level transmission paths comprise at least two of a general packet radio service, an enhanced general packet radio service, a code division multiple access, a wideband code division multiple access, a circuit switched data, and a bluetooth transmission path.

12. The first communication entity according to claim 1, wherein:

said at least one window to be adjusted is a reception window, and the first communication entity is caused to change the wireless transmission path used to another wireless transmission path during said data transfer connection, and to restrict sending of window updates for said reception window, if a transfer capacity of said other wireless transmission path is smaller than that of the wireless transmission path of said data transfer connection.

13. The first communication entity according to claim 1, wherein said results of preliminary testing comprise optimal window sizes for different wireless transmission paths using the different link level transmission paths.

14. A system that comprises a first communication entity and a second communication entity and at least one gateway element, said first communication entity and second communication entity being arranged to communicate with each other by means of a data transfer connection through said at least one gateway element and wherein said first communication entity comprises:

a processing unit, and a radio frequency part, the radio frequency part being capable of using at least two alternative wireless transmission paths for said data transfer connection between said first communication entity and said at least one gateway element, where the at least two alternative wireless transmission paths each use different link level transmission paths, the processing unit and the radio frequency part together configured to cause the first communication entity:

to pass, from a link level protocol layer to a transport level protocol layer of the data transfer connection, information identifying a wireless transmission path of the at least two alternative wireless transmission paths used for said data transfer connection, where a particular wireless transmission path of the at least two alternative wireless transmission paths used for the data transfer connection was changed, during the data transfer connection, to the wireless transmission path that uses a different link level transmission path, and where the information is passed in response to the change; and in response to the information from the link level protocol layer identifying the wireless transmission path using the different link level transmission path, adjust a size of at least one window of one or more windows that control a data transfer flow on said transport level protocol layer of the data transfer connection, wherein said adjustment is determined based at least on results of preliminary testing previously stored for said wireless transmission path using the different link level transmission path.

15. A method comprising:

establishing, using a processing unit, a data transfer connection according to a data transfer protocol between a first communication entity and a second communication entity through an at least partly wireless transmission path, said first communication entity using at least two alternative wireless transmission paths for said data transfer connection, where the at least two alternative wireless transmission paths each use different link level transmission paths;

passing, from a link level protocol layer to a transport level protocol layer of the data transfer connection, information identifying which wireless transmission path of the at least two alternative wireless transmission paths is used for said data transfer connection with the second communication entity, where a particular wireless transmission path of the at least two alternative wireless transmission paths used for the data transfer connection was changed, during the data transfer connection, to the wireless transmission path that uses a different link level transmission path, and where the information is passed in response to the change; and in response to the information from the link level protocol layer identifying the wireless transmission path that uses the different link level transmission path, adjusting, using said processing unit, a size of at least one window of one or more windows that control a data transfer flow on said transport level protocol layer of the data transfer connection, wherein said adjustment is determined based at least on results of preliminary testing previously stored for said wireless transmission path using the different link level transmission path.

16. The method according to claim 15, wherein the at least two different link level transmission paths comprise at least two of a general packet radio service, an enhanced general packet radio service, a code division multiple access, a wideband code division multiple access, a circuit switched data, and a bluetooth transmission path.

17. The method according to claim 15, wherein said second communication entity has a reception window, by which said second communication entity controls the data transfer flow from the first communication entity to the second communication entity, and the method further comprising:

receiving an indication of a size of the reception window of the second communication entity from the second communication entity;

defining in said first communication entity a congestion window to control the data transfer flow from the first communication entity to the second communication entity;

defining a maximum send window in said first communication entity;

adjusting the size of said maximum send window on the basis of the wireless transmission path used; and controlling the data transfer flow on said data transfer connection so that a smallest of the size of the reception window of the second communication entity, of a size of the congestion window of the first communication entity, and of the size of the maximum send window of the first communication entity indicates a maximum amount of data to be transmitted from said first communication entity to said second communication entity.

18. The method according to claim 15, wherein said results of preliminary testing comprise optimal window sizes for different wireless transmission paths using the different link level transmission paths.

19. A non-transitory computer readable medium embodying a computer program executed to perform operations comprising:

causing a first communication entity controlled by a processing unit to establish a data transfer connection according to a data transfer protocol between said first communication entity and a second communication entity through an at least partly wireless transmission path, said first communication entity using one of at least two alternative wireless transmission paths on said data transfer connection, where the at least two alternative wireless transmission paths each use different link level transmission paths;

causing the first communication entity to pass, from a link level protocol layer to a transport level protocol layer of the data transfer connection, information identifying which wireless transmission path of the at least two wireless transmission paths is used for said data transfer connection with the second communication entity, where a particular wireless transmission path of the at least two alternative wireless transmission paths used for the data transfer connection was changed, during the data transfer connection, to the wireless transmission path that uses a different link level transmission path, and where the information is passed in response to the change; and causing, in response to the information from the link level protocol layer identifying the wireless transmission path using the different link level transmission path, the first communication entity to adjust on said transport level protocol layer a size of at least one window of one or more windows that control a data transfer flow on said transport level protocol layer of the data transfer connection, wherein said adjustment is determined based at least on results of preliminary testing previously stored for said wireless transmission path using the different link level transmission path.

* * * * *